INVENTOR.
GERALD E. DOODY

BY Dewey J. Cunningham
ATTORNEY

Dec. 18, 1962 G. E. DOODY 3,069,667

TRANSDUCER APPARATUS

Filed Nov. 26, 1958 3 Sheets-Sheet 2

Dec. 18, 1962 G. E. DOODY 3,069,667

TRANSDUCER APPARATUS

Filed Nov. 26, 1958 3 Sheets-Sheet 3

United States Patent Office 3,069,667
Patented Dec. 18, 1962

3,069,667
TRANSDUCER APPARATUS

Gerald E. Doody, Vestal, N.Y., assignor to International Business Machines Corporation, New York, N.Y., a corporation of New York Filed Nov. 26, 1958, Ser. No. 776,631
3 Claims. (Cl. 340—174.1)

This invention relates to transducer apparatus for manifesting intelligence on a record medium and particularly to a transducer apparatus which is constructed and arranged to be lifted from an operative relationship with the record medium when the record medium is stopped, and lowered into an operating relationship with the record medium when the record medium is moving sufficiently to generate a laminar fluid boundary capable of supporting the transducer in substantially fixed spaced relationship thereto.

Magnetic transducer apparatus associated with a magnetizable record medium normally has a sensing portion which either engages or is slightly spaced from the record medium. Where the sensing portion of the transducer apparatus engages the record medium the signal strength obtainable in reading information on the record medium is higher than instances where the sensing portion is spaced therefrom. Further, the writing of information in the record medium is enhanced where the transducer can engage the record medium. As would be expected, however, the wear encountered in the transducer and the record medium is greater than instances where no engagement exists.

Where a magnetic drum is used as the record medium, the transducer apparatus is usually fixed in a position slightly spaced from the drum surface. This is fine as long as the drum surface is concentric, smooth and truly cylindrical within close limits. However, the cost of producing such a drum increases greatly as the limits decrease to zero.

The above problem was overcome to a great extent in the prior art by providing a floating transducer capable of being supported by the laminar fluid boundary adhering to the drum surface during relatively rapid rotation of the drum. The transducer is biased toward the surface but supported in substantially fixed relationship thereto by the fluid boundary. The difficulty with this approach arises with regard to wear on the transducer apparatus on the drum surface when the drum is starting and stopping and does not have a sufficient laminary fluid boundary on the drum surface to overcome the bias applied to the transducer. Aside from the wear consideration, motor size for driving the drum must be doubled over normal requirements in order to generate sufficient starting torque to overcome the friction of the transducer on the record surface. Where volume and weight are to be kept to a minimum for the complete storage system, the size of the motor should be kept at a minimum. Another problem associated with wear on the transducer and record medium is that of variation in the signal produced and obtainable in and from the record medium.

In the present invention, the above problems have been overcome by the construction of a transducer which is capable of being supported by the laminar fluid boundary on a record medium which is moving at its normal speed but capable of being lifted away from such an operative position when the speed of the record medium is less than that required for supporting the transducer.

Accordingly, it an object of this invention to provide a new and improved transducer apparatus for association with the record medium.

Another object of the present invention is to furnish a new and improved transducer apparatus which is constructed such that it may be lifted away from operative relationship with the record medium and allowed to return without disturbing its lateral or longitudinal alignment with the stored information in the particular portion of the record medium with which it was previously associated.

Still another object of the invention is to provide a new and improved transducer apparatus which is normally biased toward a record medium and supported in substantially fixed relationship to said record medium during the intervals when said record medium is moving at its normal operational speed, said transducer being lifted from said substantially fixed relation when the speed of said record medium is reduced.

A further object of the invention is to provide a magnetic transducer for association with a magnetic drum and a transducer lifting arrangement for removing said transducer from its normal operative relation with said drum.

Briefly, the present invention in the embodiment illustrated comprises a magnetic transducer for use with a drum having a magnetizable surface with which the transducer is operatively associated. The transducer is enclosed in a housing and comprises a coil and core arrangement. The coil is fixed to the housing and the core is mounted on a parallel linkage type of supporting member for movement relative to the coil. The core is capable of movement substantially perpendicular to a tangent to the magnetic drum with which the transducer is associated. A shoe capable of floating on the laminar fluid boundary adhering to the drum surface is fixedly secured to the core adjacent the end thereof to be associated with the said surface. At the opposite end of the core there is provided a rigid member which projects outside the housing to form an arm to be associated with a lever in the supporting member for the transducer housing. The aforementioned lever is secured to a rod which is rotatable by control rods connected to a central control member for the drum. Assuming that the core is positioned to float on the laminar fluid boundary, rotation of the rod in one direction causes the core to be lifted from operative relationship with the record medium. Rotation of the rod in a reverse direction allows the core to be returned to an operative relationship with the drum and the proper spacial relationship is maintained by the laminar fluid boundary. The arrangement is such that the shoes are always assured to be lifted away from the drum prior to the beginning of drum rotation and lowered only after full rotational speed of the drum is attained.

Other objects of the invention will be pointed out in the following description and claims and illustrated in the accompanying drawings which disclose, by way of examples, the principle of the invention and the best mode which has been contemplated of applying that principle.

Figure 1:
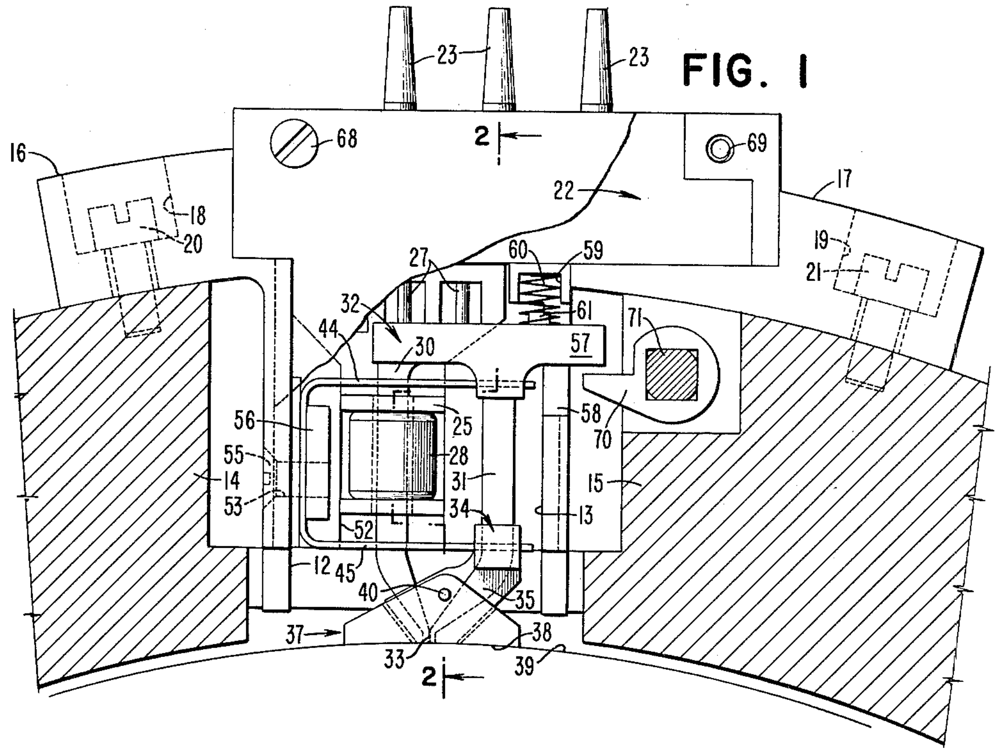
FIG. 1 is a side elevation of the present invention with the portion of the housing cover broken away to reveal the details of the transducer and its mounting arrangement.
Figure 2:
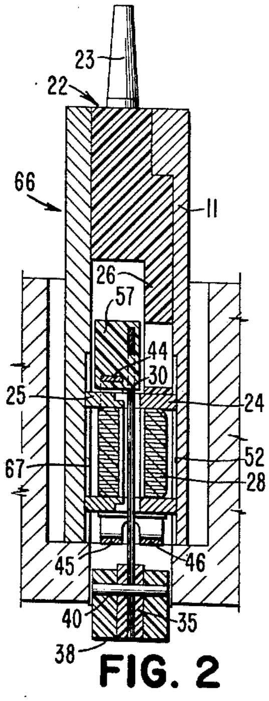
FIG. 2 is a cross-sectional view taken on lines 2—2 of FIG. 1.

For the detailed description, reference is made to FIGS. 1 through 4 wherein there is provided a housing, generally illustrated by reference numeral 10, which has a back portion 11 and side portions 12 and 13. In order to maintain the housing in its position on the head mounting bars 14 and 15, the housing is respectively provided with arms 16 and 17 which are respectively provided with apertures 18 and 19. Stud bolts 20 and 21 are respectively received by apertures 18 and 19 for securing the housing to the head mounting bars.

Figure 4:
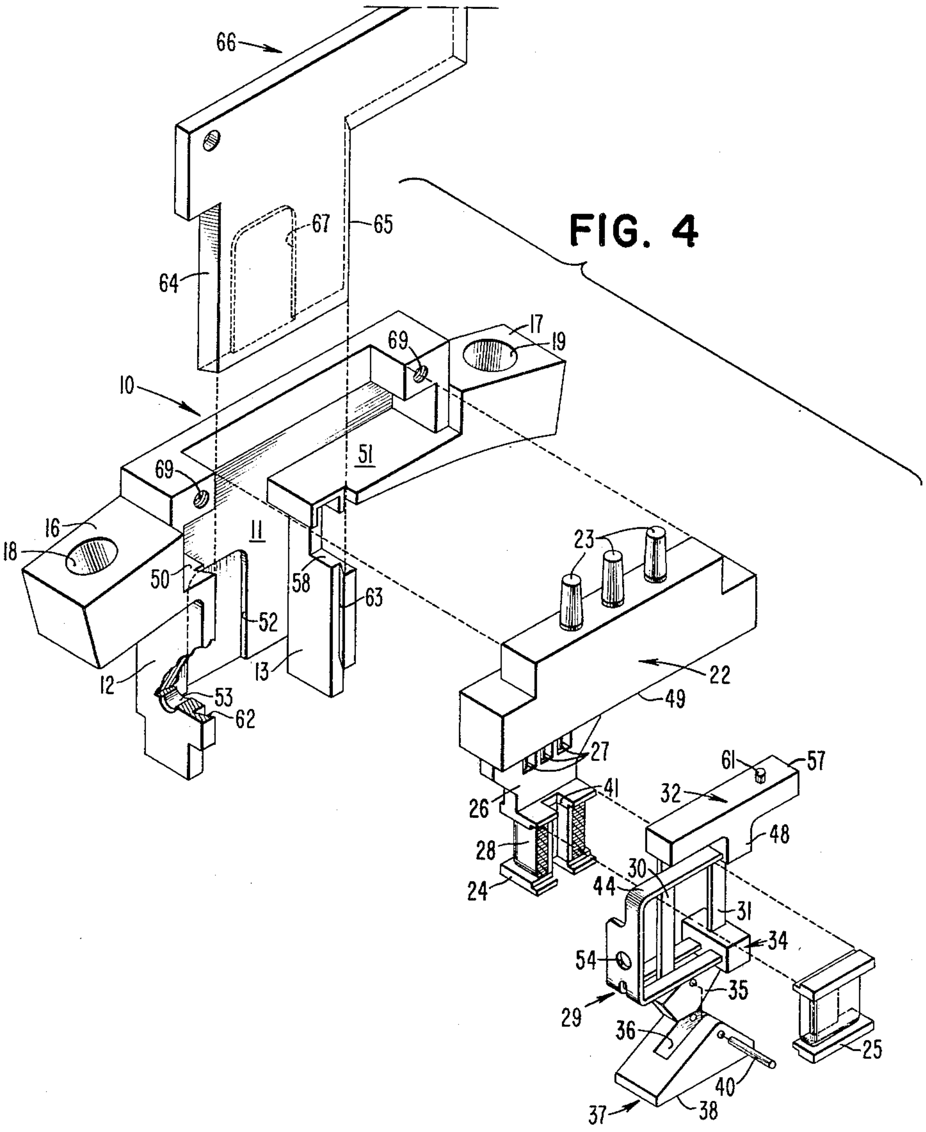
FIG. 4 is an isometric exploded view of the transducer showing the manner in which the various elements thereof are related.

As best seen in FIG. 4, the housing is generally provided with an upper and a lower compartment. The upper compartment is adapted to receive a locating terminal header 22 which is formed in a fashion to fit tightly within the upper compartment. Terminals 23 are molded into the terminal header and are utilized for making electrical connections to the transducer apparatus to be described hereinafter. The locating terminal header 22 is molded from a suitable insulating plastic material such as glass filled alkyd, which can be obtained under the commercial designation of Glasskyd 2051, manufactured by the Glasskyd Corp., Perrysburg, Ohio. The bobbin upon which the coil of the transducer is wound is shown to be comprised of two parts which are identified by reference numerals 24 and 25. The half of the bobbin identified by reference numeral 24 is molded so as to be integral with the locating terminal header 22 and is connected therewith by a connecting portion 26. It will be understood that the terminals 23 are connected by suitable electrical conductors which extend through the terminal header 22 and the connecting member 26 to terminal points 27 which are provided in the connecting member 26. The coil 28 which is adapted to be wound around the two halves of the bobbin when they are lifted together will have three leads in the embodiment shown for connection to terminals 27.

The core member for the transducer and the means for supporting it in the housing as well as in spaced relationship to the drum is illustrated generally by reference numeral 29 in FIG. 4. The assembly 29 is comprised of a core member having legs 30 and 31. Legs 30 and 31 have an integral upper portion (not shown) which is adapted to fit in a molding 32. At the lower end of arms 30 and 31, there is provided a non-magnetic gap 33. The lower end of core legs 30 and 31 are molded in a block generally illustrated by reference numeral 34 which has a foot 35 extending downwardly therefrom that is adapted to fit in a slot 36 in the shoe member 37. The lower surface 38 of the shoe member 37 is adapted to conform with the surface 39 of the magnetic drum with which the transducer is to be associated. A pin 40 is adapted to extend through the foot 35 and the sides of the shoe adjacent the slot 36 so as to pivotally mount the shoe to the foot 35.

It will be seen that the left leg 30 of the core is adapted to be received by an aperture 41 which is located centrally on the bobbin upon which the coil 28 is wound. The size of the aperture 41 is such that the leg 30 does not make contact with the bobbin during operation. Support for the assembly 29 in the housing is provided by the member shown in detail in FIG. 3.

Figure 3:
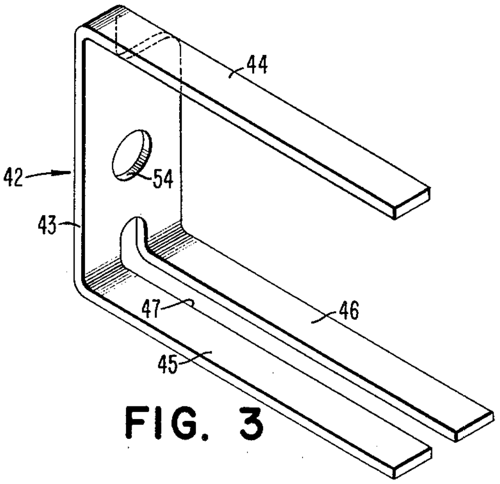
FIG. 3 shows an isometric view of the parallel linkage arrangement for supporting the transducer core and the supporting shoe therefor.

Referring to FIG. 3, there is provided a U-shaped member 42 which is constructed of a material such as that used in leaf springs. The base 43 has a leg 44 connected to one side thereof and a pair of legs 45 and 46 connected to the other side thereof, said pair of legs being separated by a slot 47 which is adapted to allow the left leg 30 of the core to pass therethrough without engagement with legs 45 and 46 during normal operation. Leg 44 is adapted to be received by an aperture in the lower portion 48 of molding 32 while legs 45 and 46 are adapted to be received by apertures in the block 34. For ease in assembly, legs 44, 45 and 46 are adapted to be cemented within the apertures which receive them.

In assembling the various portions of the transducer into the housing, the locating terminal header 22 fits in the upper compartment of the housing such that the lower surface 49 thereof rests on the surfaces 50 and 51 at the lower end of the upper compartment. The fitting of the locating terminal 22 in the upper compartment in this manner determines the position that the bobbin and the connecting member 26 between the bobbin and the terminal member are to have in the lower compartment. The back portion of the housing 11 is provided with milled out slot 52 which is adapted to receive the left half of the bobbin 24 so as to prevent the bobbin from having longitudinal movement toward or away from sides 12 and 13. The bobbin cannot move downwardly from a correct position because it is molded integral with the terminal header bar which fits tightly in the upper compartment of the housing.

Prior to assembling the contents into the housing, the two halves 24 and 25 of the bobbin are pressed together with the leg 30 of the core in the aperture 41, and the coil 28 is then wound on the bobbin. The winding is completed and the proper connections made to terminal 27. Thereafter, the terminal header is pressed in the upper compartment with the remainder of the assembly fitting in the lower compartment. An aperture 53 in the left side of the housing is aligned with the aperture 54 in the base of the U-shaped supporting member 42 to receive a bolt 55. A nut 56 is adapted to threadingly received bolt 55 so that the U-shaped supporting member 42 may be rigidly secured to the housing.

It will be noted that the molded member 32, which is constructed of a suitable plastic material, is provided with an arm 57 which is adapted to be received by an opening 58 in the side portion 13 of the housing. The arrangement is such that opening 58 is somewhat larger in a vertical direction than the vertical height of arm 57 so as to allow vertical movement of the member 32 within the opening 58. A cavity 59 is formed in the housing adjacent the upper edge of opening 58 to receive a spring 60 which is adapted to bear against the upper side of arm 57. Pin 61 on arm 57 is utilized to prevent the spring from having lateral movement.

From the above, it will be seen that the core is mounted such that it is free to move up and down relative to the surface of the drum 39 but not longitudinally or laterally with respect to the housing. In other words, the air gap 33 in the core may move upwards away from a particular track on the surface drum 39 but it is not allowed to move longitudinally along the track or laterally of the track. The spring 60 normally urges the core towards the surface of the drum. The surface 38 of the shoe is of such a size and configuration that it will float on the laminar fluid boundary adhering to drum surface 39 when the drum is rotating at its proper speed.

As best seen in FIG. 4, the front edges of sides 12 and 13 are respectively provided with slots 62 and 63 which are adapted to receive the edges 64 and 65 of a cover plate 66 in a dove-tailing fashion. The cover plate 66 is provided with a recess 67 which is adapted to receive the portion 25 of the bobbin so as to prevent longitudinal movement of the bobbin in a fashion similar to the manner in which recess 52 operates. The cover plate is adapted to be secured in place by stud bolts 68 which are received by apertures 69 in the top portion of the housing.

It has been previously mentioned that the shoe 37 will be supported in spaced relationship to the surface 39 of drum during normal rotation of the drum by the laminar fluid boundary adhering to the said surface. However, the laminar fluid boundary will not be sufficient to support the shoe during a portion of the speeding up or slowing down time of the drum and it would ride on the drum's surface. The present invention overcomes this problem by utilizing a lifting arrangement whereby the shoe if lifted away from the drum surface during the times that the drum is getting up to speed or slowing down to a stop. This accomplished by means of a lever 70 which is mounted on a shaft 71 journalled in the head mounting bar 15. It will be seen that clockwise rotation of shaft 71 will cause lever 70 to engage arm 57 so that the core and the shoe secured thereto will be lifted away from the surface of the drum. The structure utilized in mounting the core and shoe in the housing assures that the air gap 33 of the core will always be returned to the identical position that it previously had in relation to the drum when the lever 70 is rotated counterclockwise to the point where it no longer engages arm 57.

Figure 5:
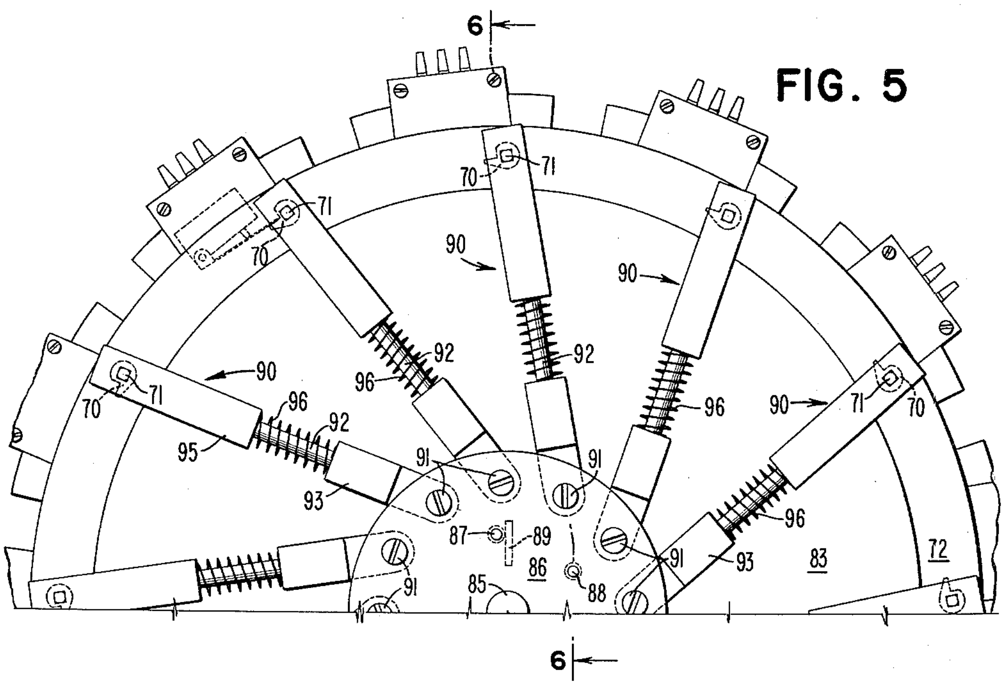
FIG. 5 is a side elevation view of the apparatus for controlling the position of the levers which in turn control the lifting of the transducers from operative relationship with the drum.
Figure 6:
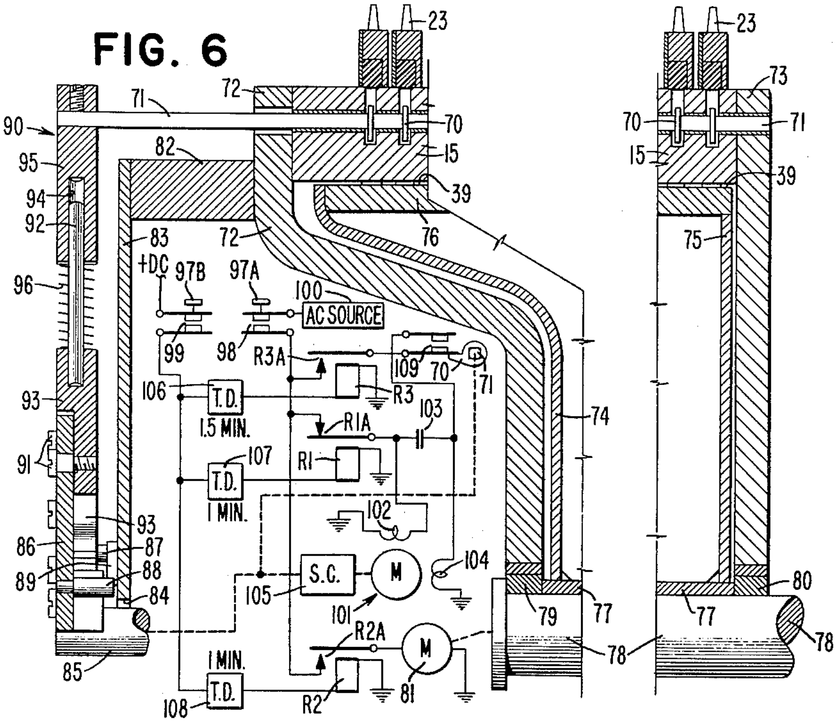
FIG. 6 is a sectional view taken on lines 6—6 of FIG. 5 and further includes details of the control circuit for the head lifting arrangement.

Referring to FIGS. 5 and 6, the overall drum is shown to comprise a frame having side members 72 and 73. A plurality of the head bars 14 and 15 are fixedly mounted between the outer edges of the aforementioned side members and around the periphery thereof. The drum is adapted to fit within the framework and is comprised of side members 74 and 75 which are connected to their outer edges by a cylindrical band 76. The surface 39 of the drum is, of course, on the outer surface of the band 76. Side members 74 and 75 are rigidly secured to a collar 77 which is keyed to the shaft 78. This shaft is journalled by suitable bearings 79 and 80 on the frame side members 72 and 73, respectively. As shown in the drawings, a motor 81 is connected to shaft 78 so as to drive it at the proper rotational speed, it being understood that the dotted lines in the drawings represent mechanical connections.

It has been previously mentioned that the lever 70 for lifting the transducer away from the drum is mounted on a shaft 71 which is journalled in the head mounting bar 15. As shown in FIG. 6, shaft 71 serves to operate several of the levers 70, there being one lever for each transducer to be controlled. In order to control shaft 71, a supporting structure is mounted on one side of frame member 72. This supporting structure comprises a cylindrical band 82 which is adapted to have one edge thereof secured to side 72. A circular plate 83 is secured to the other edge of band 82, said plate being apertured centrally thereof as at 84 to receive a drive shaft 85. A circular plate 86, somewhat smaller than plate 83, is secured to shaft 85 for rotation therewith. Plate 86 is adapted to have limited rotational movement as defined by pins 87 and 88 on plate 86 and a stop 89 on plate 83. That is, as best seen in FIG. 5, pin 87 is shown to engage stop 89 and therefore define the limit of clockwise rotation of plate 86. When the last-mentioned plate is rotated in a counterclockwise rotation a predetermined angular amount, pin 88 engages stop 89 and therefore limits further rotation in that direction.

Each of a plurality of links provided with reference numeral 90 is arranged to have one end thereof connected to plate 86 by means of a stud bolt 91 and the other end thereof keyed to shaft 71.

It will be seen that the distance between each stud bolt 91 and its associated shaft 71 will vary as the plate 86 rotates between its two limits of movement. For this reason, a telescoping arrangement is provided in which a rod 92 is secured to the inner portion 93 of the linkage 90 and is adapted to be slidably received by a drilled hole 94 in the outer portion 95 of the linkage. A spring 96 is positioned on rod 92 between portions 93 and 95 so as to normally urge said portions apart.

The control circuits for operating the head lifting arrangement and controlling the rotation of the drum are shown in FIG. 6. The blocks labelled T.D. schematically illustrate time delay elements and the note beneath each block indicates the amount of time delay. In normal practice, the time delay control of a particular relay may be integral with the relay itself. Such relays, known commercially as time delay relays operate a predetermined time after a voltage is initially applied thereto. For the purpose of the schematic operation herein, however, the time delay portion of the relay is shown separately.

Because of the fact that the drum may have stopped due to a power failure, when start button 97A and 97B are pressed to close switches 98 and 99, respectively, the heads are raised from engagement with the drum prior to any rotation of the drum. It will be seen that switch 98 allows the voltage from the A.C. source 100 to be applied through the normally closed relay contact R1A to the motor 101. The A.C. source 100 may be of the 400 cycle single phase variety. The voltage is applied directly to winding 102 of the motor and through capacitor 103 to the other winding 104 of the motor. This causes the motor to be driven in a first direction and drive shaft 85 through a slip clutch 105, the dotted lines on the drawing indicating such a mechanical drive connection. The direction of the rotation of the motor is such that if the heads were not already lifted up off of the surface of the drum they will be lifted by the rotation of the motor. For example, assuming the position of the mechanism to be that shown in FIG. 5, the shoes of all of the transducers would be resting on the drum surface. Therefore, motor 101 would rotate shaft 85, and thereby disc 86, in a counterclockwise direction until pin 88 on the disc 86 engages stop 89 on disc 83. This would cause the transducers to be raised so that the shoes thereof would no longer touch the drum surface. In the event the heads are already off the surface of the drum, which would be the case when the drum was stopped by a normal shutoff operation, the slip clutch is operative to prevent injury to the lifting mechanism. A D.C. voltage is applied through switch 99 to time delay units 106, 107 and 108 when the start button 97B is initially pressed. Time delay 107 delays the energization of relay R1 for one minute, during which time the contact R1A has allowed the head lifting motor to operate to assure that the heads are lifted from the drum. At the end of the one minute period of delay, relay R1 is energized so that contact R1A is opened, thereby stopping motor 101. Time delay 108 delays the application of the D.C. voltage to relay R2 also for a period of one minute. When energized, this relay closes contact R2A so that motor 81 is energized to rotate shaft 78 and the drum fixed thereto. Approximately twenty seconds are required for the drum to attain its normal rotational speed. This means that by this time approximately one and one-third minutes have elapsed since the operation of start buttons 97A and 97B.

Time delay 106 delays the application of energizing voltage to relay R3 for 1.5 minutes. Therefore, by the time this relay is energized to close contact R3A, the drum is up to full speed.

The closing of contact R3A allows an A.C. voltage to be applied to motor 101 through the microswitch 109, which is closed when the heads are lifted away from the drum. The lever 71 is shown in this place in the drawing only to illustrate schematically that when the lever is rotated to lift the heads off of the drum the microswitch will be closed. With the microswitch 109 closed, an A.C. voltage is now applied directly to winding 104 and through capacitor 103 to winding 102. This causes motor 101 to rotate in a direction opposite the aforementioned first direction of rotation and, thereby, return the heads so that the shoes 37 float on the laminar fluid boundary now adhering to surface 39 of the rapidly rotating drum.

When it is desired to stop the drum, switch 99 is opened so as to take the D.C. supply away from relays R1, R2 and R3. Motor 81 is now disconnected from A.C. source 100. However, relay contact R1A returns to its closed position so that the voltage from A.C. source 100 is now applied to motor 101 so as to lift the heads from the drum. The time relationships involved are such that prior to the time that the drum has slowed down to the point where the heads cannot be supported by the laminar fluid boundary, motor 101 has begun to lift the heads away from the drum. When the drum has slowed to a point where the laminar fluid boundary will not support the heads, the heads have been lifted away from the drum so that contact between the heads and the drum is avoided. As soon as time is allowed for the heads to be raised, switch 98 can be opened and motor 101 will be deenergized.

From the above-detailed description, it will be seen that I have provided a transducer apparatus which has the advantage of being supported in closely spaced relation to the record medium during the time the record medium is moving at its normal speed, and of being lifted away from the record medium during the times when its speed is such that it cannot provide a laminar fluid boundary to support the transducer. The use of the present invention results in a reduction of wear of the record medium as well as the shoe supporting the transducer on the laminar fluid boundary. Furthermore, there is not the deleterious loss of signal or variations therein which result when the core adjacent the air gap is reduced by wear. A further advantage results in that the weight and size of the drive motor can be reduced from that otherwise required. Also, without actual contact between the head shoe and the record medium, the operating temperature of the entire assembly is lower.

The construction of the head or transducer assembly is such that it may be lifted away from the record medium and returned to the same position it previously had without misalignment. That is, the air gap of the transducer is returned to its previous position without change in its lateral or longitudinal position relative to the record surface.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a record medium, said record medium being a magnetic drum, apparatus for manifesting intelligence on said record medium, supporting means for mounting said apparatus adjacent said record medium, said apparatus comprising a coil assembly which is fixed with respect to the supporting means and a core structure associated with said coil assembly, means mounting said core structure for movement relative to said coil assembly, shoe means pivotally connected to the portion of said core structure adjacent said record medium for supporting said portion in closely spaced relation to said record medium, said shoe means being constructed with a surface which is supported by the laminar boundary of fluid which adheres to the surface of said record medium during rapid movement thereof relative to said shoe means, an arm, said arm being operatively associated with and adjacent to said core structure, lever lifting means mounted on said supporting means in a position to selectively engage said arm, and means operatively connected to said lever lifting means for causing said lever lifting means to engage said arm to lift said shoe out of operative relation with said record medium when said record medium discontinues said rapid movement, thereby preventing said shoe from engaging said record medium.

2. Transducer apparatus having a coil portion and a core sensing portion in combination with a record medium which is adapted to have rapid movement relative thereto, said record medium being a magnetic drum, a housing, supporting means mounting said housing adjacent said record medium, mounting means for securing said transducer apparatus in said housing so that said coil portion is mounted fixed relative to said housing and said sensing portion is mounted for movement toward or away from said record medium and relative to said coil, resilient biasing means for urging said sensing portion toward said record medium, said sensing portion having an arm mounted thereon which extends through an aperture in said housing, a shoe pivotally mounted on said sensing portion, said shoe being supported in substantially fixed spaced relation to said record medium by the laminar fluid boundary adhering thereto during the rapid movement thereof, lifting means, said lifting means including a shaft mounted on said supporting means adjacent said housing, a lever fixed to said shaft and extending therefrom to a point adjacent said arm, a control member rotatably mounted for limiting rotation of said shaft, and a linkage connecting said control member and said shaft so that rotation of said control member in one direction causes said lever to engage said arm and to lift said sensing portion away from operative relationship with said record medium, and rotation of said control member in the opposite direction causes said lever to allow said sensing portion to return to operative relationship with said record medium, and control means, said control means being connected to said lifting means for governing the operation thereof and assuring said shoe is lifted from said drum when said drum is not in rapid movement relative thereto.

3. In transducer apparatus having a plurality of magnetic heads disposed around the periphery of a magnetic drum and a portion of said plurality of magnetic heads disposed axially said drum at each head location thereon, each said head being adapted to have its core supported by a shoe which floats on a laminar fluid boundary during operation of said magnetic drum, the improvement in combination therewith comprising: means to lift each said head from said drum surface whenever the speed of said drum is insufficient to maintain said laminar fluid boundary, said lifting means including a plurality of actuating shafts, one said shaft being axially adjacent each said magnetic head peripheral location, a first lever arm fixedly attached to each said head, a second lever arm fixedly coupled to each said axial shaft adapted to engage said first lever arm on each said head, motive power means adapted to rotate each said axial shaft to cause said second lever arm thereon to engage each respective said first lever arm on its axial location whenever said magnetic drum angular velocity is insufficient to maintain said laminar fluid boundary, and sensing means to discern when each said head is lifted from said drum surface and when it is floating on said laminar fluid boundary.

References Cited in the file of this patent

UNITED STATES PATENTS

| | | |
|---|---|---|
| 2,862,781 | Baumeister | Dec. 2, 1958 |
| 2,863,004 | Maclay et al. | Dec. 2, 1958 |
| 2,950,354 | Hohnecker | Aug. 23, 1960 |